US012780455B2

United States Patent

Van Der Jagt et al.

(10) Patent No.: US 12,780,455 B2
(45) Date of Patent: Nov. 3, 2026

(54) METHOD OF ACQUISITION OF ANALYTES WITH AN UNMANNED MOBILE PLATFORM, MOBILE DELIVERY PLATFORM, ASSEMBLY AND USE

(71) Applicant: Nederlandse Organisatie voor toegepast-natuurwetenschappelijk onderzoek TNO, 's-Gravenhage (NL)

(72) Inventors: Oscar Christoph Van Der Jagt, Delfgauw (NL); Marta Maria Jezierska-Switala, Rotterdam (NL); Hanno Hildmann, Amsterdam (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 270 days.

(21) Appl. No.: 18/700,391

(22) PCT Filed: Oct. 14, 2022

(86) PCT No.: PCT/NL2022/050589
§ 371 (c)(1),
(2) Date: Apr. 11, 2024

(87) PCT Pub. No.: WO2023/063828
PCT Pub. Date: Apr. 20, 2023

(65) Prior Publication Data
US 2024/0409246 A1 Dec. 12, 2024

(30) Foreign Application Priority Data
Oct. 14, 2021 (EP) .................................... 21202718

(51) Int. Cl.
*B64U 10/14* (2023.01)
*G01N 1/22* (2006.01)
*B64U 101/35* (2023.01)

(52) U.S. Cl.
CPC ........... *B64U 10/14* (2023.01); *G01N 1/2273* (2013.01); *B64U 2101/35* (2023.01); *G01N 2001/2279* (2013.01)

(58) Field of Classification Search
CPC .. B64U 10/14; B64U 2101/35; G01N 1/2273; G01N 2001/2279; G01N 2001/022; G01N 2001/2285; G01N 2001/245
See application file for complete search history.

(56) References Cited

U.S. PATENT DOCUMENTS 7,511,809 B2 * 3/2009 Schneider ............ G01N 1/2273 73/28.01
8,413,527 B2 * 4/2013 Timmis ................ G01N 1/2273 73/863.02

(Continued)

FOREIGN PATENT DOCUMENTS

CN 108528718 A * 9/2018 ............ B64D 47/00
CN 110068524 A 7/2019

(Continued)

OTHER PUBLICATIONS

Machine Translation of KR 101716868B1.*
International Search Report and Written Opinion—PCT/NL2022/050589—mailing date Apr. 20, 2023.

*Primary Examiner* — Francis C Gray
(74) *Attorney, Agent, or Firm* — Banner & Witcoff, Ltd.

(57) ABSTRACT

The present disclosure relates to remote accumulation of an analyte from a fluid medium in a fluid sampler that comprises a collection medium for accumulating the analyte. There is provided a mobile platform (20) configured to perform delivering the fluid sampler (10) to a target location for sampling the fluid medium. The high volume fluid sampler is connected to a conduit (30) that opens a position upstream or downstream of a fluid displacement means (21) for propelling the platform. Operating the displacement (Continued)

means generates a sampling flow F that exposes the collection medium, thereby accumulating the analyte, if present.

16 Claims, 2 Drawing Sheets

(56) References Cited

U.S. PATENT DOCUMENTS

| | | | | |
|---|---|---|---|---|
| 8,820,672 | B2 | 9/2014 | Erben et al. | |
| 2020/0326262 | A1* | 10/2020 | Fairweather | B64D 41/00 |

FOREIGN PATENT DOCUMENTS

| | | | | |
|---|---|---|---|---|
| CN | 113086215 A | | 7/2021 | |
| KR | 10-2010-0008726 A | | 1/2010 | |
| KR | 101716868 B1 | * | 3/2017 | G01N 1/24 |
| WO | 2021163459 A1 | | 8/2021 | |

* cited by examiner

METHOD OF ACQUISITION OF ANALYTES WITH AN UNMANNED MOBILE PLATFORM, MOBILE DELIVERY PLATFORM, ASSEMBLY AND USE

CROSS-REFERENCE TO RELATED APPLICATIONS

This application is a U.S. National Stage application under 35 U.S.C. § 371 of International Application PCT/NL2022/050589 (published as WO 2023/063828 A1), filed Oct. 14, 2022, which claims the benefit of priority to Application EP 21202718.9, filed Oct. 14, 2021. Benefit of the filing date of these prior applications is hereby claimed. Each of these prior applications is hereby incorporated by reference in its entirety.

TECHNICAL FIELD AND BACKGROUND

The present disclosure relates to of remote accumulation of an analyte from a fluid medium. In particular to mobile delivery platforms configured and method therefore that use a pressure differential generated by a fluid displacement means comprised in a mobile delivery platform to accumulate analytes associated to a presence of a controlled or hazardous substance in a fluid sampler comprising a collection medium.

The use of mobile and possibly unmanned platforms for remote sensing missions has rapidly increased in recent years, mainly due to advances made in the required technologies to either improved efficiency (batteries, engines, control elements), reduces cost, or reduced weight (micro-controllers, hardware elements, etc.). In addition, the control algorithms required to operate complex mobile systems are steadily being advanced with e.g., entire flight systems being commercially available.

While the use of such systems is clearly offering various benefits, the practical realization of deployable detection systems is often hampered by the additional requirements incurred from the required additional peripheral systems. For example, any mobile sensing platform incurs operational costs proportional to the dimensions and the weight of its payload systems. Conversely, the resulting limitations regarding the weight or the size of the payload impacts the performance delivered by the payload.

Generally speaking the finer a sensing resolution or the higher the required data precision the larger the combined weight (and likely dimensions) of the peripheral system itself, as well as that of its power supply.

U.S. Pat. No. 8,820,672 discloses an unmanned aerial vehicle that uses a draft generated by a ducted fan to guide an air flow past an avionics pod holding a sensor for analyzing a quality characteristic of the air. In practice the disclosed system including guiding an air flow past a sensor by a draft generated by a ducted fan was found to provide limited performance.

Accordingly, there remains a need for methods and systems offering remote sensing missions having improved performance, in terms of sensitivity and/or selectivity towards analytes to be detected, and/or methods and systems that offer reduced penalties incurred by the additional peripheral systems.

SUMMARY

The present invention aims to mitigate one or more of the penalties or disadvantages incurred by the known systems, and/or offer further benefits in performance, in particular for detecting a presence of an analyte at a concentration below a typical detection limit of a commercial sensor.

Accordingly, aspects of the present disclosure relate to a method of remote accumulation of an analyte from a fluid medium in a fluid sampler, e.g. a high volume air sampler, that comprises a collection medium for accumulating the analyte. The method comprises delivering the fluid sampler to a target location for sampling the fluid medium by a mobile delivery platform. The fluid sampler is connected to a conduit for guiding a sampling flow of the medium. The conduit opens at a position upstream or downstream of a fluid displacement means comprised in the mobile platform for propelling the mobile delivery platform. The method further comprises generating, at the sampling location, a flow of the fluid medium through the conduit. The flow is generated by operating the fluid displacement means as comprised in the mobile platform. The generated the flow exposes the collection medium to the fluid medium, thereby accumulating the analyte, if present.

Further aspects of the present disclosure relate to: a mobile delivery platform, configured to perform the method of remote accumulation of an analyte in a fluid sampler that comprises a collection medium for accumulating the analyte as disclosed herein; an assembly of the mobile platform and a fluid sampler comprising the collection medium; and to a use of a pressure differential generated by a fluid displacement means comprised in a mobile delivery platform for propelling the mobile delivery platform.

The mobile delivery platform comprises a fluid displacement means for propelling the mobile delivery platform and means for carrying, preferably reversibly, the fluid sampler. The fluid sampler can be mounted to, e.g. carried by, or otherwise associated to the mobile delivery, e.g. by bolts, screws, or via a magnetic link, or otherwise reversibly connectable means.

The mobile platform and/or fluid sampler is provided with a conduit configured for connecting to an outlet of the fluid sampler. At an opposing terminal end the conduit opens at a position upstream or downstream of the fluid displacement means. The configuration can thus be understood to provide a flow path for the medium between a first one of the outlets of the fluid sampler across the collection medium to a position in the direct vicinity of the fluid displacement means of the mobile delivery platform via the second one of the outlets and the conduit. Operation of this displacement means, e.g. during a displacement operation of the mobile platform, generates a pressure differential relative to ambient, whereby at the downstream position the pressure is higher (overpressure) and at the upstream position the pressure is lower (under pressure) relative to the pressure at the fluid sampler. Thus, depending on the conduit opening downstream or upstream of the fluid displacement means, a flow of the medium is either blown into or sucked out of the fluid sampler via the conduit. Preferably, the conduit opens at a position upstream of the fluid displacement means. Drawing the medium into the fluid sampler mitigates potential sorption and/or cross contamination due to analyte sorption along an inner wall of the conduit. Reducing the effect of unspecific sorption along the conduit wall can be of particular relevance when the system is used to the sample fluid medium at a plurality of locations and/or for detection of analytes having a low concentration, e.g. below about 1 part per million (ppm) or lower. For example in a range between 1 ppm and 100 part per billion (ppb), in a range between 1 ppm and 10 ppb, or even lower such as <1 ppb, e.g. between 1 ppb and 100 part per trillion (ppt), or below 1 ppt.

Advantageously the method, platform and assembly as disclosed herein advantageously allows monitoring a presence of a controlled or hazardous substance, material, object and/or device, by enabling remote detection of a substance such as a gas or vapor indicative of a presence of said material, object and/or device. In particular by detection a gaseous or vapor particulate material, referred to herein as analyte, emanated from said material, object and/or device. Alternatively, or in addition, the method, platform and assembly can be used to directly detect compounds, e.g. dangerous or controlled substances, such as poisons gasses, vapors, and or particulate matter. Advantageously the method, platform and assembly as disclosed herein allow detection of target analyte while minimizing a risk of exposing staff to the analyte, even when the substance is presence in a concentration below a detection limit of conventional analysis tools. Importantly, and in addition to mitigating exposing staff to analyte, the operating staff and/or the platform can remain hidden from an observer during a detection mission. Thus enabling the staff to remain unobserved by the owners of the material, object and/or device, e.g. in case of criminal activity. Additionally, the staff can remain out of direct reach/danger of the effects of the material, object and/or device, such as in case of an unexpected rapid reaction of the material such as an explosion.

Exposing the collection medium to a flow of the fluid medium advantageously allows collecting, accumulating, a detectable amount of the analyte, if present, in the collection medium.

Using a fluid displacement means as already comprised in the mobile delivery platform, e.g. for proposition, to expose the collection medium to a flows of the fluid medium by employing the pressure differential advantageously mitigates the need to include a separate flow generator, e.g. a pump. Using a flow generator and power source already comprised in the mobile delivery platform reduces a total overall weight of the system which improves versatility and/or an operation range of the assembly as commonly required components such as a flow generator and power source for the fluid sampler can be omitted.

Preferably, the mobile delivery platform is a drone or an unmanned aerial vehicle (UAV), whereby the fluid displacement means comprises one or more of a fan or a rotor. In a preferred embodiment the platform can be a so-called micro UAV or nano UAV. Advantageously, reduced dimensioning reduces potential visibility by onlookers and/or improves maneuverability in tight and congested spaces such as indoor spaces like luggage handling facilities. A disclosure by J. Burgués, V. J. Reddi, and G. C. H. E. de Croon (IEEE/RSJ Int. Conf. on Intelligent Robots and Systems 2021, retrievable under: arxiv.org/abs/2107.05490) is an example of a trend of reducing dimensions of UAVs. However, analyte collection systems including pumps and power supplies do not scale. Therefore the gain of using a fluid displacement means as comprised in the UAV for analyte collection as disclosed herein increases with decreasing dimensions of the UAV.

Inventors found that the invention is not limited to vehicles comprising a so-called ducted fan, which encloses the rotor. Surprisingly the inventors found and validated that the draft generated by a ductless fan can be used to advantage to collect measurable quantities of target in a fluid sampler. Use of a fan without a duct can advantageously further reduce the overall weight of the system.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
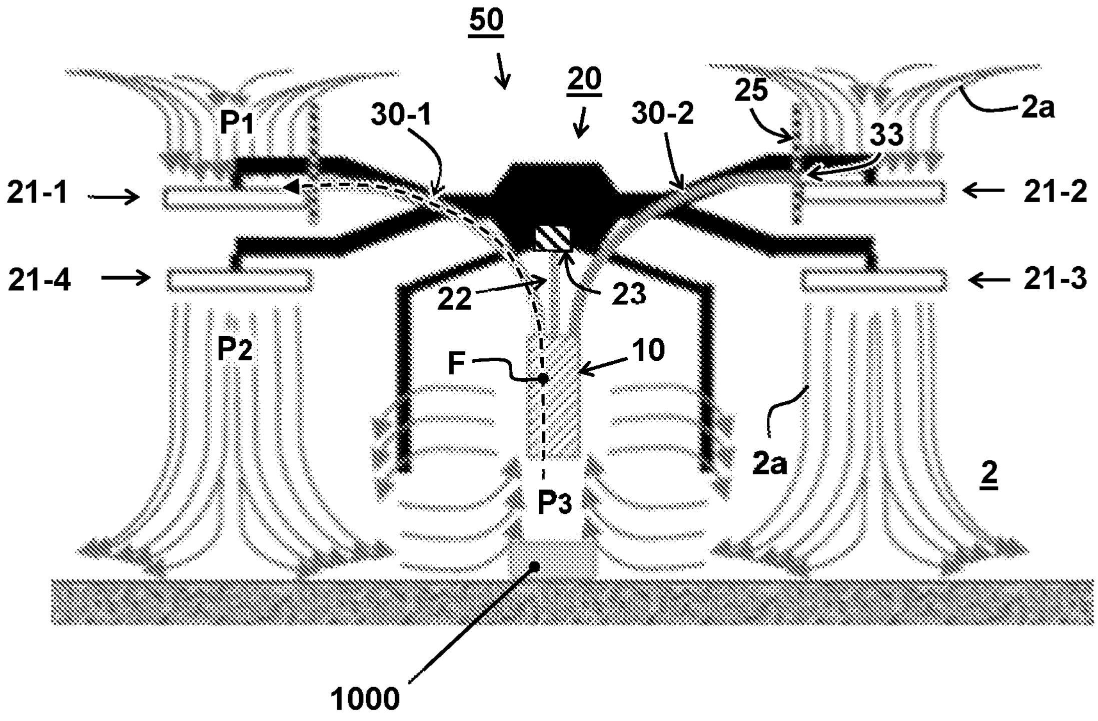
FIG. 1A schematically illustrates an embodiment of an assembly of mobile platform and a fluid sampler during a stage of remote accumulation of an analyte.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

The term 'analyte' as used herein can be understood to relate to specific substances of any form for which presence is to analyzed. Analytes thus include specific compounds, molecules, aerosols and/or particulate of interest. Such as those that can be associated to a presence of a controlled or hazardous substance such as one or more of explosives, nerve agents, and drugs, VOCs, and hazardous vapors and gasses. The term 'remote accumulation' can be understood to concern accumulation, or sample collection, by an unmanned platform as opposed to manned on-site sample collection and remote sensing where analysis is performed from a distance without prior sample collection or preconcentration, e.g., a camera used from far away to record changes in the real world over time, effectively making measuring the impact of light on its environment.

The term fluid sampler as used herein generally refers to instruments used to collect analytes from samples of air or other fluid media. The instrument comprises a sorbent for retaining, accumulating, the target analytes, e.g. particles, comprised in the air. Suitable fluid samplers and collection media in relation to a target analyte or class of analytes to be accumulated are generally known in the field. A distinction between high volume and low volume fluid samplers can be made on account of an intended amount of fluid (e.g. air) that is to be sampled whereby High volume air samplers typically refer to instruments configured to sample more than 100 cubic meters ($m^3$), more than 500 $m^3$, or even more than 1500 $m^3$ of air over a 24-hour period, while low volume air samplers draw only 24 $m^3$ of air per day, or less. For the context of the present disclosure a high volume air sampler may be preferred in view of a comparatively higher sorption capacity and/or smaller flow resistance allowing a comparatively larger flow at a given pressure differential. Fluid samplers may be acquired from numerous commercial sources under names including high and low volume samples or air samplers. Examples of fluid samplers and collection media include but are not limited to: cotton; solid phase microextraction (SPME) fibres; Tenax sorbent tubes, and Gerstel Twister samplers.

The term micro- or nano-UAVs can be considered to relate to UAVs having overall dimension (width×length×height) in a range below 40×40×40 centimeter.

FIG. 1 schematically illustrates an embodiment of an assembly 50 of mobile platform 20 and a high volume fluid sampler 10 configured to perform the method 100 of remote accumulation of an analyte from a fluid medium 2 in a high volume fluid sampler 10 comprising a collection medium 11 for accumulating the analyte as disclosed herein.

Figure 2A:
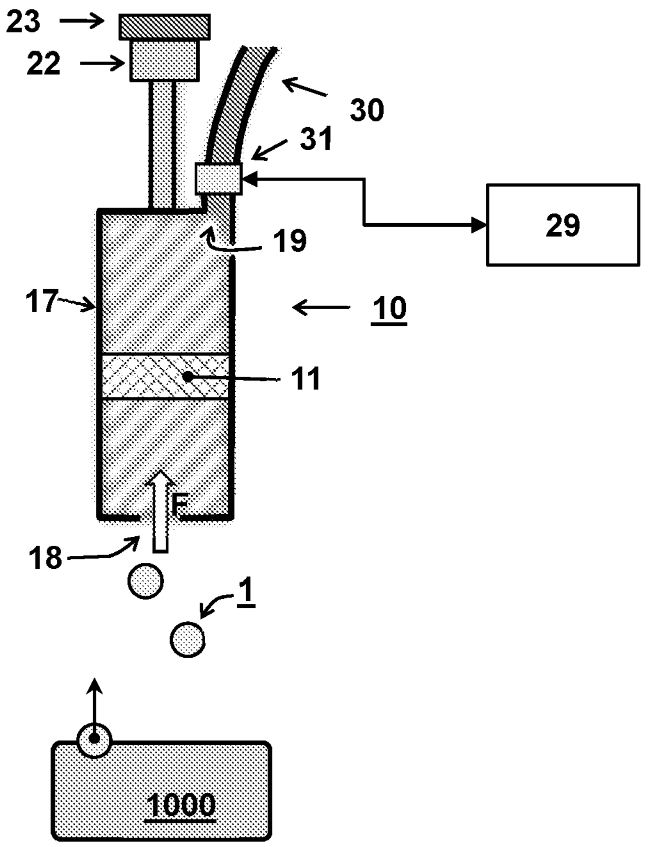
FIG. 2A provides a schematic partial cross-section view of an assembly during a stage of remote accumulation of an analyte.
Figure 2B:
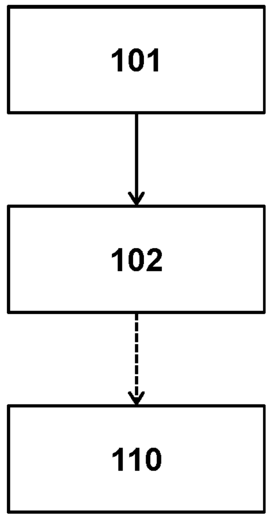
FIG. 2B provides a schematic representation of a method of remote accumulation of an analyte.

As illustrated in FIG. 2B the method comprises at least the steps of delivering 101 the high volume fluid sampler 10 by a mobile delivery platform 20 to a target location for sampling the fluid medium 2, and generating 102, at the sampling location, a flow F of the fluid medium 2 through the conduit 30 thereby generating the flow F and exposing the collection medium 11 to the fluid medium 2, thereby accumulating the analyte, if present. Following analyte accumulation the medium is generally analyzed for a presence of analyte. Analyzing 110 is typically performed with an analysis tool having a high sensitivity for the target analyte. Preferably the analysis is performed off-site. That is the detector or analyzer in generally not carried by the mobile platform. Instead the fluid sampler is generally transported for analysis to a base station remote from a target analysis site. This advantageously further reduces the operational weight of the platform and allows the use dedicated analysis equipment with desired sensitivity and/or selectivity, such as CG-MS. Alternatively or in addition, a detector, can be provided to the mobile delivery platform 20 and/or the fluid sampler 10. This can reduce a total analysis time. In such cases the system preferably also includes a wireless readout to transmit a readout of the detector.

As illustrated in FIG. 1A the assembly is shown during a stage of generating the sampling flow F, which follows after positioning 101 the assembly 50 to a location in the direct vicinity of an object 1000 to be investigated for a presence of target analytes. The object can be any object, e.g. a car, package, container, suspect of containing controlled or hazardous substances, a presence of which can be determined by detecting a presence of a target analyte, e.g. emitted volatiles such as a vapor or a gas, associated to such substance.

The mobile delivery platform 20 is in the form of a UAV. The UAV comprises a central housing including a number of arms provided with a rotor 21-1, 21-2, 21-3, 21-4 for propelling the mobile delivery platform 20. The mobile delivery platform 20 comprises means for carrying the high volume fluid sampler 10 and a conduit 30-1, 30-2 configured for connecting to an outlet of the high volume fluid sampler 10 and opening at a position upstream or downstream of the fluid displacement means 21. The conduit opens near the rotor at a position associated to a pressure differential (P1–P2) generated by said rotor during operation as indicated by the arrows (2*a*) indicating the flow of fluid medium 2, air. The disclosure uses this principle to temporarily and in a controlled manner use the draft generated by the fluid displacement means, not for propulsion, but to direct an airflow through the conduit 30. Specifically, in the embodiment shown inventors temporarily divert part of the under pressure created by the propellers from creating lift to creating an under pressure in a pipe 30 connected ultimately to high volume fluid sampler.

In a preferred embodiment the conduit 30 opens at a position upstream of the fluid displacement means 21. Positioning the opening 33 of the conduit at an upstream position advantageously draws a flow F of ambient air from the position marked P3 across the fluid sampler towards the rotor via the conduit. Drawing the air directly into the fluid sampler increases collection performance by minimizing contact of sampled air with tubing side walls prior to collection. Alternatively, or in addition, drawing in air directly into the fluid sampler 10 allows localized fluid sampling from a volume at the high volume fluid sampler 10. Turbulence generated by the rotors can further direct analyte from the object towards an inlet at the high volume fluid sampler 10, further increasing the amount of analyte taken up in the collection medium.

Positioning the opening below the rotor would direct the flow in the opposite direction, which could be used to draw in air from a more distant position, e.g. reference position, allowing the sampling of ambient, e.g. for collection of a base-line reading.

As schematically shown in FIG. 2A, the high volume fluid sampler 10 generally comprises a housing with a collection medium and first and second apertures defining a flow path across the collection medium 11. The medium can comprise a sorption medium, e.g. a filter or sorbent, suitable for accumulating analytes from the fluid medium 2, e.g. ambient air. Sorption of analytes can be based on size or a specific size range, e.g. a filter. Preferably the medium is configured or selected to preferentially collect a certain analyte or class of analytes from the medium. Preferential adsorption, can be size based, physisorption based or chemisorption based.

FIG. 2A depicts a schematic partial cross-section view of an assembly 50 comprising a mobile delivery platform, drone 20, carrying an exemplary embodiment of a high volume fluid sampler 10 during a stage of remote accumulation of an analyte 1 emitted from an object 1000 to be analyzed. The high volume fluid sampler 10 is provided with means 22, a connector, for reversable assembling the high volume fluid sampler 10 to a matching interconnector 23 provided on the mobile delivery platform 20. The high volume fluid sampler 10 includes a housing 17 defining an inner volume holding a collection medium 11 for collecting the analyte 1. The housing is provided with two openings 18, 19 providing fluid connection to the medium. One of the openings 18 serves as an inlet for the flow F of the medium across the collection medium 11. The other opening 19 serves as an outlet and is connected to a conduit 30 opening upstream of a rotor comprised in the platform, e.g. as shown in FIG. 1A.

In another or further preferred embodiment, the method, comprises controlling a rate and/or duration, preferably both, of the flow F by affecting a pressure differential across the fluid sampler. Controlling the rate and/or duration advantageously allows determining a total volume of fluid medium 2 passed which can be used to determine a concentration of analyte at a sampling location, e.g. by dividing a total collected amount of analyte by the total collected volume of fluid medium. Methods and means for affecting a pressure differential across the fluid sampler will be explained in more detail hereinbelow.

Controlling the rate and/or duration generally includes measuring a duration and/or flow rate. In some embodiments, the method comprises determining a quantity of the fluid medium exposed to the collection medium. In a preferred embodiment, the method comprises determining a concentration of the analyte by correlating a determined amount of accumulated analyte to the quantity of the fluid medium exposed to the collection medium.

Figure 1B:
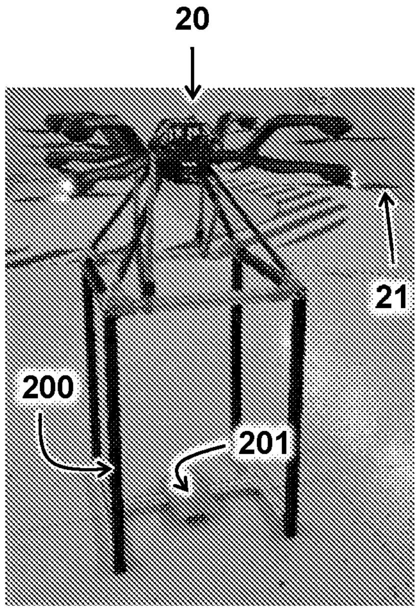
FIGS. 1B and C depict embodiments of a UAV provides and a detailed view of an assembly of a UAV carrying a fluid sampler.

In some embodiments, the flow rate and/or total quantity of the fluid medium exposed to the collection medium is measured by an appropriate means, e.g. a flow sensor. Alternatively, or in addition, the flow rate and/or total exposed quantity can be determined in a calibration step, e.g. by collecting analyte from a sample having a known rate of emitting analyte under similar sampling conditions. FIG. 1B depicts an experimental setup including a mobile delivery platform 20 positioned above a frame 200 comprising a vertically positional holder 201 for a sample emitting analyte. The setup allows adjusting a separation distance to the mobile delivery platform 20 and the high volume fluid sampler (not shown). This allows calibrating a pressure differential by correlating a determined amount of accumulated analyte for a given accumulation condition, e.g. a sampling time, rotor speed, constriction valve setting, and/or opening position as explained in more detail herein below.

In one embodiment, e.g. as shown in the embodiment depicted in FIG. 2A, controlling the rate and duration of the flow comprises adjusting a condition of a restriction valve 31 associated to the conduit 30 and/or the fluid sampler. Provision of a constriction valve advantageously allows sampling for a presence of analyte at a target location, e.g. by closed the valve during the step of carrying the fluid sampler to a site of interest and opening the valve when the platform is in a desired position, e.g. at the relative to an object to be analyzed.

Preferably, there is no direct contact to the object to be analyzed. This mitigates disturbances which can be of particular relevance when analyzing objects suspect of comprising a hazardous substance, e.g. an explosive. Alternatively the platform, e.g. a drone, can land in the vicinity of an object to be analyzed. This can increase a potential sampling time by reducing power needed for keeping the drone airborne and/or simplifies control when desiring to reduce the power of its fluid displacement means, blades.

In another or further embodiment, controlling the rate and duration of the flow F comprises adjusting an orientation and/or separation distance of the opening 31 of the conduit 30 relative to the fluid displacement means 21. FIG. 1A illustrates a means 25, e.g. an actuator, to adjusted a vertical position and/or angle of the opening 31 relative to the rotor. Moving the opening towards the rotor increases a flowrate whereas positioning the opening at a more distant position reduces a pressure differential across the samples and reduces the flow rate. Generally the opening is within 5 centimeters from the fluid displacement means, e.g. within 0.5 and 2 cm from a rotor.

The opening 33 of the conduit 30 is typically kept about perpendicular (+/−) 10° to a displacement of the medium 2 across the fluid displacement means. This maximizes the rate of the flow F through the fluid sampler. The diameter and length of the conduit also affect flow rate. he diameter of the conduit is generally selected within an appropriate range. The length of the conduit is preferably minimized to minimize pressure drop across the conduit. Likewise, the diameter is generally selected such that the pressure drop across the conduit is less than the pressure drop across the high volume fluid sampler 10. Generally the diameter is in a range between 0.5 and 10 millimeter, typically 2-5 mm.

In some embodiments, controlling the rate and duration of the flow F comprises regulating a displacement rate of the fluid displacement means 21. For example, by setting an operating power of the fluid displacement means 21, e.g. the rpm, or pitch angle of the propeller blades. It was found that regulating the flow rate of a limited number (e.g. 1 or 2) of fluid rotors in UAVs comprising a plurality of additional rotors (e.g. 8) is possible without losing aerial control over the vehicle.

Figure 1C:
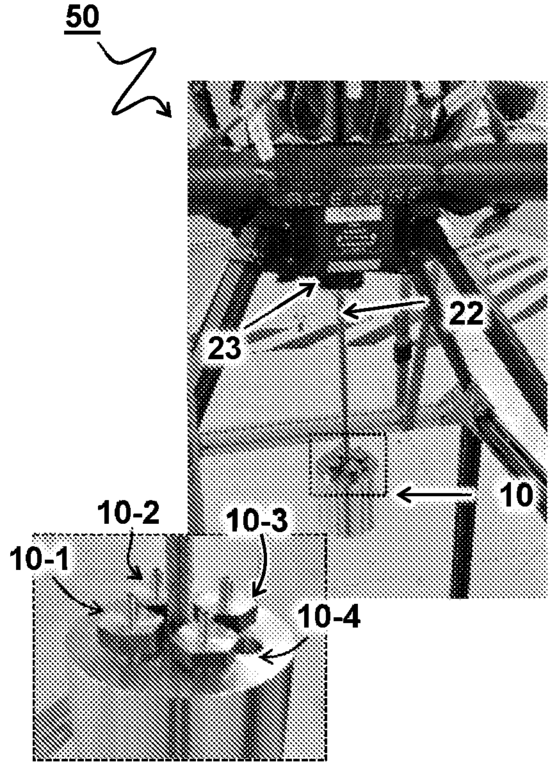

In some embodiments the system comprises a plurality of conduits 30-1, 30-2 and/or a plurality of fluid samplers, e.g. high volume fluid samples 10-1, 10-2, 10-3, 10-4. The conduits can each be fluidly connected to a single high volume fluid sampler 10, e.g. as shown in FIG. 1A. This increases a total flow passed across the collection medium 11 for a given sampling period. The assembly can advantageously comprise a plurality of fluid samples, e.g. high volume fluid samplers 10-1, 10-2, 10-3, 10-4 as shown in FIG. 1C depicting a partial view of an assembly comprising four high volume fluid samplers. Each sampler can be connected to a corresponding one or more of the conduits. Each conduit opening at a position upstream or downstream of the or a further fluid displacement means 21-1, 21-2, 21-3, 21-4 comprised in the mobile platform for propelling the mobile delivery platform 20. In one embodiment, each fluid sampler comprises a different collection medium selected to collect one or more of a plurality of different analytes. This advantageously allows analyzing a suspect object for a plurality of analytes with a single sampling step. Alternatively, or in addition, the system can comprise a plurality of fluid samplers 10 with the same or a similar collection medium 11. This allows for temporal distinction between analysis runs, e.g. between a number of sequentially visited sampling areas and/or temporally spaced sampling periods as a given sampling location.

It will be understood that in order to regulate the rate and duration of the flow by affecting a pressure differential across the sampler the system can be provided with a controller 29 to adjust one or more of: an orientation and/or separation distance of the opening 31 of the conduit 30 relative to the fluid displacement means; a displacement rate of the fluid displacement means 21; and a condition of a restriction valve 31. Advantageously the system may use a controller and/or communication means already comprised in the mobile delivery platform.

It will be appreciated that the disclosure is not limited to aerial vehicles, the method of remote can in principle be applied with any platform, preferably a remotely controlled or autonomous vehicle, comprising a fluid displacement means. Possible applications include wheeled vehicles, such as cars, rovers, and nautical platforms including but not limited to boats and submarines.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages. It is appreciated that this disclosure offers particular advantages to detection of controlled and/or hazardous substances, and in general can be applied for any application wherein presence of an analyte in low concentration regimes within a fluid medium is to be monitored.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method of remote accumulation of an analyte from a fluid medium in a fluid sampler comprising a collection medium for accumulating the analyte, the method comprising:

delivering the fluid sampler by a mobile delivery platform to a target location for sampling the fluid medium, wherein an outlet of the fluid sampler is connected to a conduit opening at a position upstream of a fluid displacement means comprised in the mobile platform for propelling the mobile delivery platform, and generating, at the sampling location, a flow of the fluid medium through the conduit, by operating said displacement means thereby generating the flow and exposing the collection medium to the fluid medium, thereby accumulating the analyte, if present.

2. The method according to claim 1, comprising controlling a rate and duration of the flow by affecting a pressure differential across the fluid sampler.

3. The method according to claim 2, wherein controlling the rate and duration of the flow comprises adjusting a condition of a restriction valve associated to the conduit and/or the fluid sampler.

4. The method according to claim 2, wherein controlling the rate and duration of the flow comprises:

adjusting an orientation and/or separation distance of the opening of the conduit relative to the fluid displacement means.

5. The method according to claim 2, wherein controlling the rate and duration of the flow comprises:

regulating a displacement rate of the fluid displacement means.

6. The method according to claim 1, comprising determining a quantity of the fluid medium exposed to the collection medium.

7. The method according to claim 6, comprising:

determining a concentration of the analyte by correlating a determined amount of accumulated analyte to the quantity of the fluid medium exposed to the collection medium.

8. A mobile delivery platform comprising a fluid displacement means for propelling the mobile delivery platform, configured to perform the method according to claim 1, the mobile delivery platform comprising:

means for carrying a fluid sampler comprising a collection medium for accumulating the analyte, and a conduit configured for connecting to an outlet of the fluid sampler and opening at a position upstream of the fluid displacement means.

9. The mobile delivery platform according to claim 8, wherein the mobile delivery platform is an unmanned aerial vehicle (UAV), whereby the fluid displacement means comprises at least one fan.

10. The mobile delivery platform according to claim 8, configured to adjust a condition of a restriction valve associated to one or more of the fluid sampler and the conduit.

11. The mobile delivery platform according to claim 8, configured to adjust a position and/or separation distance between the conduit and fluid displacement means.

12. The mobile delivery platform according to claim 8, configured to regulate a displacement rate of the fluid displacement means by one or more of adjusting a rotational speed of a fan comprised in the fluid displacement means, and adjusting a pitch angle of a blade comprised in the fan.

13. An assembly of a mobile platform according to claim 8 and a fluid sampler comprising a collection medium.

14. The assembly according to claim 13, comprising a plurality of the fluid samplers, each connected to a corresponding conduit opening at a position upstream of the or a further fluid displacement means comprised in the mobile platform for propelling the mobile delivery platform, wherein each fluid sampler comprises a collection medium for collecting one or more specific analytes from a plurality of different analytes.

15. A method for accumulating analytes associated to a presence of a controlled or hazardous substance in a fluid sampler comprising a collection medium, the method comprising using a pressure differential generated by a fluid displacement means of a mobile delivery platform for propelling the mobile delivery platform for said accumulating analytes in said fluid sampler, wherein an outlet of the fluid sampler is connected to a conduit opening at a position upstream of the fluid displacement means.

16. The mobile delivery platform of claim 9, wherein the UAV is a micro UAV.

* * * * *